United States Patent
He

(10) Patent No.: US 10,516,334 B1
(45) Date of Patent: Dec. 24, 2019

(54) POWER CIRCUIT, DRIVING CIRCUIT FOR DISPLAY PANEL, AND DISPLAY DEVICE

(71) Applicant: HKC Corporation Limited, Shenzhen, Guangdong (CN)

(72) Inventor: Huailiang He, Guangdong (CN)

(73) Assignee: HKC Corporation Limited, Shenzhen (CN)

( * ) Notice: Subject to any disclaimer, the term of this patent is extended or adjusted under 35 U.S.C. 154(b) by 0 days.

(21) Appl. No.: 16/427,325

(22) Filed: May 30, 2019

Related U.S. Application Data

(63) Continuation of application No. PCT/CN2018/117061, filed on Nov. 23, 2018.

(30) Foreign Application Priority Data

Nov. 1, 2018 (CN) .................. 2018 2 1796249 U

(51) Int. Cl.
  *G09G 3/36* (2006.01)
  *H02M 3/07* (2006.01)
  *G05F 1/56* (2006.01)

(52) U.S. Cl.
  CPC .............. *H02M 3/07* (2013.01); *G05F 1/56* (2013.01); *G09G 3/36* (2013.01)

(58) Field of Classification Search
  CPC ............ G05F 1/56; G05F 1/563; H02M 3/06; H02M 3/07; H02M 3/072; H02M 3/155; H02M 3/156; H02M 3/158; G09G 3/36
  See application file for complete search history.

(56) References Cited

U.S. PATENT DOCUMENTS

| | | | |
|---|---|---|---|
| 5,627,741 A | 5/1997 | Naruo et al. | |
| 5,751,278 A * | 5/1998 | Inamori | G09G 3/3681 345/211 |
| 7,446,745 B2 * | 11/2008 | Morita | G09G 3/3688 345/90 |
| 9,208,724 B2 * | 12/2015 | Kim | G09G 3/3233 |
| 2017/0229087 A1 * | 8/2017 | Xu | G09G 3/3696 |
| 2018/0218707 A1 * | 8/2018 | Huang | G09G 3/3648 |

FOREIGN PATENT DOCUMENTS

| | | |
|---|---|---|
| CN | 1116369 A | 2/1996 |
| CN | 101840296 A | 9/2010 |
| CN | 107482905 A | 12/2017 |

* cited by examiner

*Primary Examiner* — Matthew V Nguyen

(57) ABSTRACT

The present application discloses a power circuit, a driving circuit of a display panel, and a display device. A voltage dividing module is connected between the power input end and the input end of a power converter, and a controlled end of the power converter is connected to a first control end of a power chip. An input end of a first switch module is connected to an output end of the power converter, and an output end of the first switch module is connected to an output end of the power. A controlled end of the first switch module is connected to a second control end of the power chip. At this time, the voltage dividing module divides a voltage of the power output by the output end of the power.

20 Claims, 1 Drawing Sheet

US 10,516,334 B1

POWER CIRCUIT, DRIVING CIRCUIT FOR DISPLAY PANEL, AND DISPLAY DEVICE

CROSS REFERENCE TO RELATED APPLICATIONS

This application is a Continuation Application of PCT Application No. PCT/CN2018/117061 filed on Nov. 23, 2018, which claims the benefit of Chinese patent application No. 201821796249.8 titled "POWER CIRCUIT, DRIVING CIRCUIT FOR DISPLAY PANEL, and DISPLAY DEVICE" applied on Thursday, Nov. 1, 2018, the disclosure of which is incorporated herein by reference in its entirety.

FIELD OF THE DISCLOSURE

The present application relates to the technical field of power modules, in particular, to a power circuit, a driving circuit for display panel, and a display device.

BACKGROUND OF THE DISCLOSURE

In the current art, with the development of electronic technology, more and more electronic devices are being used. At the same time, due to the uniformity of power supply standards and the difference in operating voltages of different electronic devices, a power chip and an electronic switch are provided in the power circuit of all electronic devices to adjust the power input to the line and output to the application circuit.

Most power chips use electronic switches to adjust the output power. When operating, the temperature of the electronic switch is high. If the temperature is too high, it will affect the performance and life of the components.

SUMMARY OF THE DISCLOSURE

The main purpose of the present application is to provide a power circuit aimed at achieving the purpose of reducing the temperature of an existing power circuit.

To achieve the above purpose, the present application provides a power circuit comprising:

a power input end;

a power chip having a first control end and a second control end; the power chip outputs a first control signal through a first control end, and outputs a second control signal through a second control end;

a voltage dividing module, an input end of which is connected to the power input end;

the voltage dividing module outputs after dividing a voltage of the power input from the power input end;

a power converter, an input end of which is connected to an output end of the voltage dividing module, and a controlled end of which is connected to the first control end of the power chip; the power converter outputs after converting a power voltage output by the voltage dividing module according to the first control signal;

a first switch module and a power output end, an input end of the first switch module being connected to an output end of the power converter, and an output end of the first switch module being connected to the power output end, and a controlled end of the first switch module being connected to the second control end of the power chip; the first switch module adjusts a size of a power voltage output by the power converter according to the second control signal.

Optionally, the voltage dividing module includes a common output end and a plurality of voltage dividing resistors; the plurality of voltage dividing resistors are sequentially connected in series between the power input end and the ground, a connection node between the two voltage dividing resistors connected to each other constitutes a voltage dividing output end, and the common output end is separately connected to any one of the voltage dividing output ends through a conductive member.

Optionally, the conductive member is a resistor or a metal wire.

Optionally, the number of the common output ends is configured corresponding to the number of the connection ends, and on a circuit substrate carried by the voltage dividing module, each of the common output ends is configured adjacent to and corresponding to a position of one of the connection ends.

Optionally, the power converter includes a second switch module and an energy storage module; an input end of the second switch module is connected to an output end of the voltage dividing module, an output end of the second switch module is an output end of the power converter, and a common connection end of the second switch module is connected to an output end of the energy storage module; an input end of the energy storage module is a controlled end of the power converter.

Optionally, the second switch module includes a first diode and a second diode; an anode of the first diode is an input end of the second switch module, and a cathode of the first diode is connected to the anode of the second diode; a connection node of the first diode and the second diode is a common connection end of the second switch module, and the cathode of the second diode is an output end of the second switch module; the energy storage module is a first capacitor, a first end of the first capacitor is an input end of the energy storage module, and a second end of the first capacitor is an output end of the energy storage module.

Optionally, wherein the first switch module is encapsulated in the power chip.

Optionally, the power circuit further includes a first voltage stabilizing module; an input/output end of the first voltage stabilizing module is respectively connected to an input end of the first switch module and an output end of the second switch module.

Optionally, the first voltage stabilizing module is a second capacitor, a first end of the second capacitor is an input/output end of the first voltage stabilizing module, and a second end of the second capacitor is grounded.

Optionally, the energy storage module is a first capacitor, a first end of the first capacitor is an input end of the energy storage module, and a second end of the first capacitor is an output end of the energy storage module.

Optionally, the first switch module includes a first triode and a tenth resistor; a base of the first triode is connected to a first end of the tenth resistor, and a connection node of the base of the first triode and the first end of the tenth resistor is a controlled end of the first switch module; a collector of the first triode is an output end of the first switch module, and an emitter of the first triode is connected to a second end of the tenth resistor; a connection node of the emitter of the first triode and the second end of the tenth resistor is an input end of the first switch module.

Optionally, the power circuit further includes a second voltage stabilizing module and a third voltage stabilizing module; a first end of the second voltage stabilizing module is respectively connected to an input end of the first switch module, and a second end of the second voltage stabilizing module is grounded; a first end of the third voltage stabilizing module is connected to an output end of the voltage dividing module, and a second end of the third voltage stabilizing module is grounded.

To achieve the above purpose, the present application also provides a driving circuit for display panel comprising the power circuit as described above.

To achieve the purpose above, the present application also provides a display device comprising the driving circuit for display panel as described above.

The present application provides a power input end, a power output end, a power chip, a power converter, a first switch module and a voltage dividing module in the power circuit. Among them, the power chip outputs a first control signal through the first control end, and outputs a second control signal through the second control end; then, the power converter adjusts an output first voltage value according to the first control signal, and the power converter outputs after converting a power voltage output by the voltage dividing module according to the second control signal. Finally, the voltage dividing module adjusts a size of a power voltage output by the power converter so that the flow through the first switch module is reduced, thereby achieving the purpose of reducing the temperature of the power chip. The present application solves the technical problem that the existing power circuit is overheated.

BRIEF DESCRIPTION OF THE DRAWINGS

In order to illustrate the technical schemes in the embodiments of the present application or in the prior art more clearly, the drawings which are required to be used in the description of the embodiments or the prior art are briefly described below. It is obvious that the drawings described below are only some embodiments of the present application. It is apparent to those of ordinary skill in the art that other drawings may be obtained based on the structures shown in accompanying drawings without inventive effort.

Figure 1:
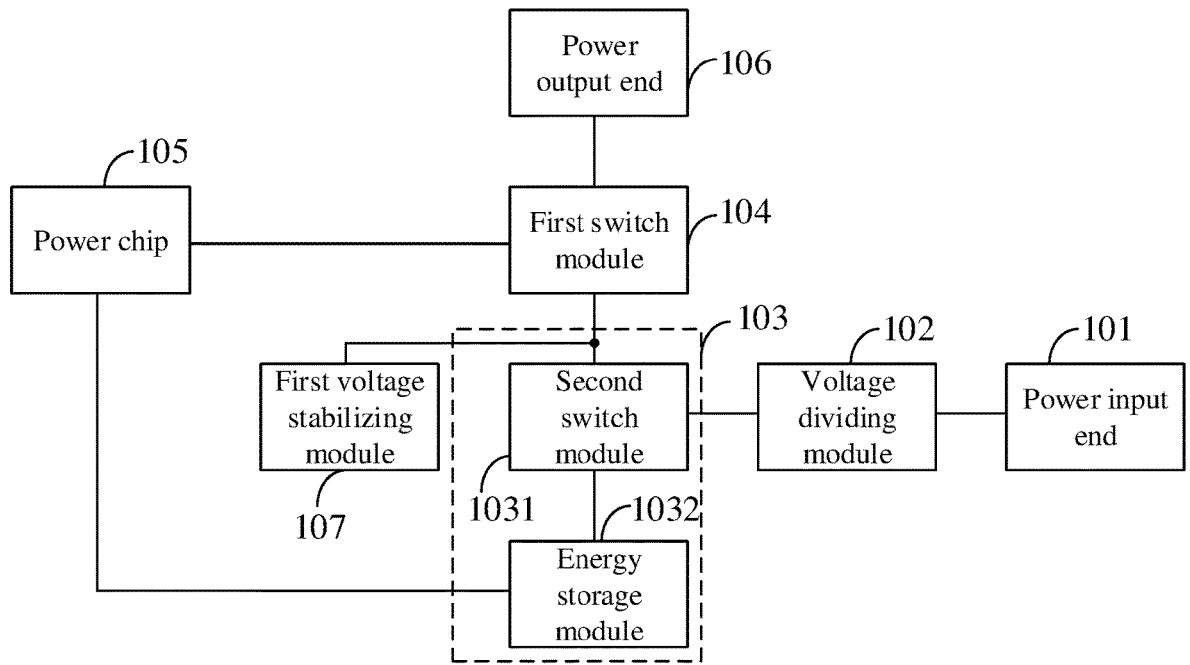
FIG. 1 is a modular view of a power circuit of the present application.

With reference to the drawings, the implement of the object, features and advantages of the present application will be further illustrated in conjunction with embodiments.

DETAILED DESCRIPTION OF THE EMBODIMENTS

The technical schemes of embodiments of the present disclosure will be clearly and completely described in the following with reference to the accompanying drawings. It is obvious that the embodiments to be described are only a part rather than all of the embodiments of the present disclosure. All other embodiments obtained by persons of ordinary skill in the art based on the embodiments of the present disclosure without creative efforts shall fall within the scope of protection of the present disclosure.

It is to be understood that, all of the directional instructions in the exemplary embodiments of the present disclosure (such as top, down, left, right, front, back) can only be used for explaining relative position relations, moving condition of the elements under a special form (referring to figures), and so on, if the special form changes, the directional instructions changes accordingly.

In addition, if the embodiments of the present application relates to the descriptions of "first", "second" and the like, they are only used for the purpose of description only, and are not to be construed as indicating or implying their relative importance or implicitly indicating the number of technical features indicated. Thus, features defined with "first", "second" may include at least one such feature, either explicitly or implicitly. In addition, the technical solutions between the various embodiments may be combined with each other, provided that those skilled in the art can implement it, and when the combination of the technical solutions is contradictory or impossible to implement, it should be considered that the combination of these technical solutions does not exist, nor is it within the scope of protection required by this application.

The present application provides a power circuit used to solve the technical problem that the existing power circuit is overheated.

In an embodiment of the present application, the power circuit comprises a power input end 101, a power output end 106, a power chip 105 having a first control end and a second control end, a power converter 103, a first switch module 104, and a voltage dividing module 102. An input end of the voltage dividing module 102 is connected to the power input end 101, an input end of the power converter 103 is connected to an output end of the voltage dividing module 102, and a controlled end of the power converter 103 is connected to a first control end of the power chip 105; an input end of the first switch module 104 is connected to an output end of the power converter 103, an output end of the first switch module 104 is connected to the power output end 106, and a controlled end of the first switch module 104 is connected a second control end of the power chip 105.

Among them, the power chip 105 outputs a first control signal through the first control end, and outputs a second control signal through the second control end; the voltage dividing module 102 outputs after dividing a voltage of the power input from the power input end 101; the power converter 103 outputs after converting a power voltage output by the voltage dividing module 102 according to the first control signal; finally, the first switch module 104 adjusts a size of a power voltage output by the power converter 103 according to the second control signal, to reduce the voltage drop of the first switch module 104, thereby reducing the temperature of the first switch module 104 that is prone to heat generation for achieving the effect of reducing the temperature of the power circuit.

In above embodiment, the first control signal output by the power chip 105 adjusts the magnitude of the first voltage value output by the power converter 103, and the second control signal output by the power chip 105 adjusts the magnitude of the second voltage value output by the first switch module 104, thereby reducing the voltage difference of the first switch module 104, further causing less heat generation of the first switch module 104, so that the temperature of the first switch module 104 may be lowered to lower the temperature of the power circuit. It should be noted that if the first switch module 104 is integrated into the power chip 105, the temperature increased by integrating the first switch module 104 in the power chip 105 may also be reduced. Thereby, the power circuit where the power chip 105 and the power chip 105 are located is protected, and a better cooling effect is achieved.

In an embodiment, the driving object of the power circuit is exemplified by an LCD (Liquid Crystal Display) drive board. In the LCD drive board, the first switch module 104 is an electronic switch, and the turn-on voltage of a TFT (Thin Film Transistor) is defined as VGH. In the present embodiment, VGH (turn-on voltage of TFT)=LX (high level of the second voltage value)+VI2 (voltage of the voltage dividing module 102)−VT (voltage difference between the input end and the output end of the first switch module 104). Therefore, in the present embodiment, the voltage of the first switch module 104 may be changed by changing the voltage of the voltage dividing module 102, thereby reducing the voltage of the first switch module 104 to lower the temperature of the first switch module 104, and achieving a good cooling effect from the hardware level.

Optionally, the voltage dividing module 102 includes a common output end and a plurality of voltage dividing resistors; the plurality of voltage dividing resistors are sequentially connected in series between the power input end 101 and the ground, a connection node between the two voltage dividing resistors connected to each other constitutes a voltage dividing output end, and the common output end is separately connected to any one of the voltage dividing output ends through a conductive member.

Among them, the voltage dividing effect is different when the input end of the voltage dividing module 102 is connected to any one of the output ends of the voltage dividing module 102. Therefore, in a specific production process, different ports may be connected according to different needs, and it is only necessary to produce a corresponding voltage dividing resistor to achieve a better voltage dividing effect and save material. In addition, it is also possible to increase the number of output ends of the voltage dividing module 102 and add various options. At this time, the output ends of the different voltage dividing modules 102 correspond to different voltage drop ranges. Selecting a suitable voltage drop range may make the voltage drop of the first switch module 104 smaller and achieve a better cooling effect. Specifically, the voltage drop range and the output of the voltage dividing module 102 are selected experimentally. It is particularly noted that when the output end of the corresponding voltage dividing module 102 is selected, only the input end of the voltage dividing module 102 requires to be connected to the circuit, and the input ends of the other voltage dividing modules 102 are vacantly connected. Optionally, in the production process, different products correspond to the output ends of different voltage dividing modules 102. When producing a specific product, if the output end of the most suitable voltage dividing module 102 is measured, it is only necessary to produce a portion between the output end of the corresponding voltage dividing module 102 and the power converter 103, and weld the output end of the corresponding voltage dividing module 102 to the input end of the power converter 103. In this way, the best range of voltage dividing and temperature reduction effects may be achieved, so that the cooling effect for the products produced may be optimized to the utmost extent. Optionally, the conductive member is a resistor or a metal wire. Optionally, the number of the common output ends is configured corresponding to the number of the connection ends, and on a circuit substrate carried by the voltage dividing module 102, each of the common output ends is configured adjacent to and corresponding to a position of one of the connection ends.

Optionally, the voltage dividing module 102 includes a first resistor R1, a second resistor R2, a third resistor R3 and a fourth resistor R4, a fifth resistor R5, a sixth resistor R6, a seventh resistor R7, an eighth resistor R8, and a ninth resistor R9; the common output end includes a first output end, a second output end, a third output end, and a fourth output end; the first end of the first resistor R1 is a first output end of the voltage dividing module 102, and the second end of the first resistor R1, the first end of the second resistor R2, and the first end of the third resistor R3 are connected. The second end of the second resistor R2 is connected to the power input end 101, the first end of the fourth resistor R4 is connected to the second end of the third resistor R3, and the second end of the fourth resistor R4 is the second output end of the voltage dividing module 102. The first end of the sixth resistor R6 is a third output end of the voltage dividing module 102, and the second end of the sixth resistor R6, the first end of the fifth resistor R5, and the first end of the seventh resistor R7 are connected; the second end of the fifth resistor R5 is connected to the power input end 101. The first end of the eighth resistor R8 and the second end of the seventh resistor R7 are connected to the first end of the ninth resistor R9; the second end of the eighth resistor R8 is the fourth output end of the voltage dividing module 102, and the second end of the ninth resistor R9 is grounded; the third output end of the voltage dividing module 102 is connected to the input end of the power converter 103. Or, the fourth output of the voltage dividing module 102 is connected to the input end of the power converter 103.

Among them, when the input end of the voltage dividing module 102 is connected to the first output end of the voltage dividing module 102, the voltage dividing module 102 is composed of the first resistor R1 and the second resistor R2, and the voltage input by the power input end 101 is divided by the second resistor R2, the third resistor R3, the fifth resistor R5, the seventh resistor R7, and the ninth resistor R9. When the input end of the voltage dividing module 102 is connected to the first output end of the voltage dividing module 102, the output voltage has the magnitude of the voltage divided by the second resistor R2 and output via the first resistor R1. When the input end of the voltage dividing module 102 is connected to the second output end of the voltage dividing module 102, the output voltage has the magnitude of the voltage divided by the second resistor R2 and the third resistor R3 and output via the fourth resistor R4. When the input end of the voltage dividing module 102 is connected to the third output end of the voltage dividing module 102, the output voltage has the magnitude of the voltage divided by the second resistor R2, the third resistor R3 and the fifth resistor R5 and output via the sixth resistor R6. When the input end of the voltage dividing module 102 is connected to the fourth output end of the voltage dividing module 102, the output voltage has the magnitude of the voltage divided by the second resistor R2, the third resistor R3, the fifth resistor R5 and the seventh resistor R7 and output via the eighth resistor R8. In this way, different voltage dividing effects when connecting different output ends are realized on a specific circuit, so that the process of voltage dividing is more intuitive and controllable. It is worth noting that the voltage dividing effect may be better and more stable by adjusting the resistance value and designing more groups of voltage dividing resistors to achieve better cooling effect. Optionally, the resistances of the first resistor R1, the fourth resistor R4, the sixth resistor R6, and the eighth resistor R8 may be 0 ohms. At this time, the first resistor R1, the fourth resistor R4, the sixth resistor R6, and the eighth resistor R8 function as a connection conduction, and thus may be a 0 ohm resistor.

Optionally, the power converter 103 includes a second switch module 1031 and an energy storage module 1032; an input end of the second switch module 1031 is connected to an output end of the voltage dividing module 102, an output end of the second switch module 1031 is an output end of the power converter 103, and a common connection end of the second switch module 1031 is connected to an output end of the energy storage module 1032; an input end of the energy storage module 1032 is a controlled end of the power converter 103.

Among them, the second switch module 1031 is an alternative switch. When the control signal input by the common connection end of the second switch module 1031 is at a high level, the output end of the second switch module 1031 is connected to the input end of the first switch module 104, and the common connection end of the second switch module 1031 is connected to the output end of the energy storage module 1032, then the energy storage module 1032 discharges. When the control signal input by the common connection end of the second switch module 1031 is at a low level, the input end of the second switch module 1031 is connected to the output end of the voltage dividing module 102, and the common connection end of the second switch module 1031 is connected to the output end of the energy storage module 1032, thereby charging the energy storage module 1032. Therefore, the voltage output by the power converter 103 may be ensured to be stabilized at a value, so that the value input to the first switch module 104 is stable, the situation that the lifting amplitude of the first switch module 104 is too large and causes heat generation since it is necessary to compensate for the voltage drop or voltage increase of the power converter 103 may be avoided. Thereby, the power of the first switch module 104 is stabilized, and a good cooling effect is achieved.

Optionally, the power circuit further includes a first voltage stabilizing module 107; an input/output end of the first voltage stabilizing module 107 is respectively connected to an input end of the first switch module 104 and an output end of the second switch module 1031.

Among them, when the control signal input by the common connection end of the second switch module 1031 is at a high level, the power converter 103 charges the first voltage stabilizing module 107. When the control signal input by the common connection end of the second switch module 1031 is at a low level, the first voltage stabilizing module 107 discharges. In this way, a better stable output of the power converter 103 may be achieved, so that the circuit operates more smoothly and stably.

Optionally, the energy storage module 1032 is a first capacitor C1, a first end of the first capacitor C1 is an input end of the energy storage module 1032, and a second end of the first capacitor C1 is an output end of the energy storage module 1032.

Among them, when the energy storage module 1032 is the first capacitor C1, the operating delay is relatively small, so that the overall response of the circuit is rapid, and the direct current may be insulated, so that the current input to the second switch module 1031 is an alternating current (AC). Then, the turn-on and turn-off of the corresponding path of the second switch module 1031 may be directly controlled. At the same time, the first capacitor C1 may also store the corresponding direct current when there is direct current in the first capacitor C1 to realize a voltage difference at the corresponding DC input end and the other end, so that the voltage value of the DC input end is the sum of the DC voltage value and the AC voltage value, thereby achieving the voltage stabilization effect.

Optionally, the first voltage stabilizing module 107 is a second capacitor C2, a first end of the second capacitor C2 is an input/output end of the first voltage stabilizing module 107, and a second end of the second capacitor C2 is grounded.

Among them, the voltage output after passing through the power converter 103 is direct current, and the second capacitor C2 stores the corresponding direct current, so that the voltage between the input/output end of the second capacitor C2 and the ground end is a DC voltage, thereby stabilizing the output voltage of the power converter 103 for achieving a better voltage stabilization effect.

Optionally, the second switch module 1031 includes a first diode D1 and a second diode D2; an anode of the first diode D1 is an input end of the second switch module 1031, and a cathode of the first diode D1 is connected to the anode of the second diode D2; a connection node of the first diode D1 and the second diode D2 is a common connection end of the second switch module 1031, and the cathode of the second diode D2 is an output end of the second switch module 1031.

Among them, when the common connection end of the second switch module 1031 is at a positive level, the second diode D2 is turned on. When the common connection end of the second switch module 1031 is at a negative level, the second diode D2 is turned off. The process of configuring the first diode D1 and the second diode D2 here to realize the function of an alternative switch does not require additional control signal control, and only by means of a signal of a rated voltage in the circuit for achieving control. This control process is simple and easy to implement. And, this control process is easier to control than the existing art, and achieves a better technical effect with the energy storage module 1032 and the first voltage stabilizing module 107 in the present application.

Optionally, the energy storage module 1032 is a first capacitor C1, a first end of the first capacitor C1 is an input end of the energy storage module, and a second end of the first capacitor C1 is an output end of the energy storage module. The first voltage stabilizing module 107 is a second capacitor C2, a first end of the second capacitor C2 is an input/output end of the first voltage stabilizing module 107, and a second end of the second capacitor C2 is grounded.

Among them, when the first capacitor C1 stores energy, the second capacitor C2 releases energy. Conversely, when the first capacitor C1 releases energy, the second capacitor C2 stores energy. The combination of the two functions to stabilize the output voltage of the circuit in which the first capacitor C1 and the second capacitor C2 are located. The realized structure is simple, the voltage stabilizing effect is good, the reaction is fast, has good practicability, and low industrial production cost, and is suitable for mass production. At this time, the first capacitor C1 functions to store charges and raise voltages.

Optionally, the first switch module 104 includes a first triode Q1 and a tenth resistor R10; a base of the first triode Q1 is connected to a first end of the tenth resistor R10, and a connection node of the base of the first triode Q1 and the first end of the tenth resistor R10 is a controlled end of the first switch module 104; a collector of the first triode Q1 is an output end of the first switch module 104, and an emitter of the first triode Q1 is connected to a second end of the tenth resistor R10; a connection node of the emitter of the first triode Q1 and the second end of the tenth resistor R10 is an input end of the first switch module 104.

Among them, when the voltage of the base of the first triode Q1 is such that the first triode Q1 is turned on, the voltage between the emitter and the base of the first triode Q1 may be adjusted by adjusting the current of the base, so that the first triode Q1 may adjust the magnitude of the output voltage as needed. Therefore, after the first triode Q1 is divided for the voltage, the output voltage may be adjusted only by adjusting the base current without replacing other transistors, so that the operating process is simpler and more convenient to use. At the same time, the presence of the tenth resistor R10 causes a voltage difference between the base and the emitter of the first triode Q1 to reach a turn-on condition, and keeps the turn-off state of the first triode Q1 stable when the first triode Q1 is turned off.

Optionally, the power circuit further includes a second voltage stabilizing module 108 and a third voltage stabilizing module 109; a first end of the second voltage stabilizing module 108 is respectively connected to an input end of the first switch module 104, and a second end of the second voltage stabilizing module 108 is grounded; a first end of the third voltage stabilizing module 109 is connected to an output end of the voltage dividing module 102, and a second end of the third voltage stabilizing module 109 is grounded.

Among them, the second voltage stabilizing module 108 and the third voltage stabilizing module 109 are connected to the circuit to respectively stabilize the voltage input to the power converter 103 and the voltage of the output end of the first switch module 104. Therefore, it is ensured that the voltage output by the power circuit reaches the voltage of the external device for driving, so that the operation of the entire circuit is smoother. Optionally, the second voltage stabilizing module is a third capacitor C3, and the third voltage stabilizing module is a fourth capacitor C4.

Figure 2:
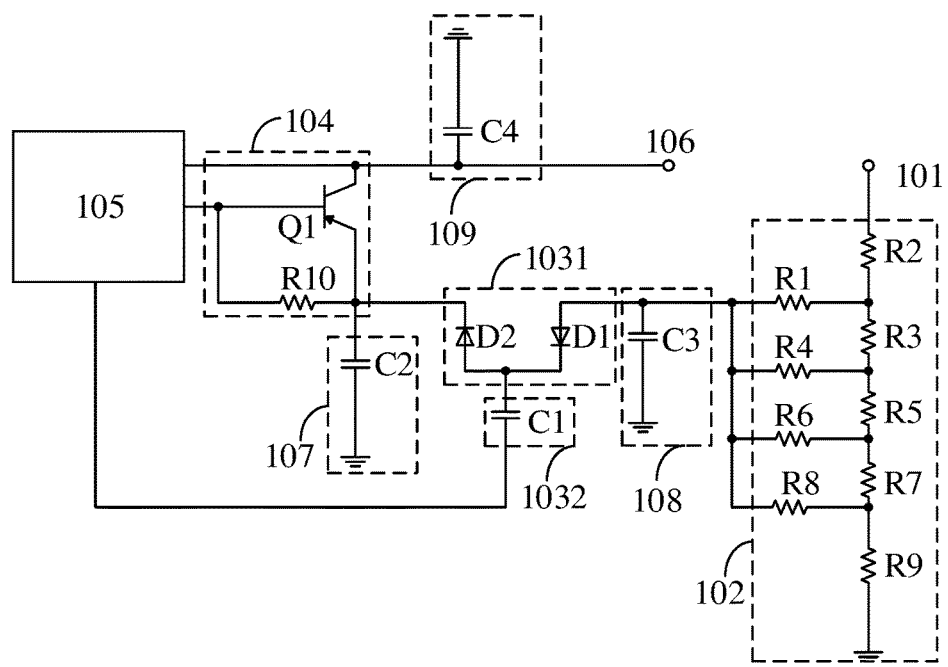
FIG. 2 is a circuit view of a power circuit of the present application.

The principle of the present application will be described below with reference to FIGS. 1 and 2.

The power chip 105 outputs a first control signal through the first control end, and outputs a second control signal through the second control end, the first control signal being a square wave voltage switched between high and low levels; when the circuit is in an initial state, upon the first control signal being at a low level (0V), the first diode D1 and the second diode D2 are both turned on, and the voltage of the power input end 101 is divided by the voltage dividing resistor to charge the first capacitor C1 and the second capacitor C2 while the voltages of the first end of the first capacitor C1 and the first end of the second capacitor C2 being the output voltage VI2 of the voltage dividing module 102.

When the first control signal is at a high level (assuming that the high level is VLX), the voltage of the second end of the first capacitor C1 is VLX+VI2. At this time, the first diode D1 is turned off, the second diode D2 is turned on, the first capacitor C1 charges the second capacitor C2, and the voltage of the first end of the second capacitor C2 becomes VLX+VI2.

When the first control signal is again at a low level, the first diode D1 is turned on, the second diode D2 is turned off, and the voltage of the first end of the second capacitor C2 is maintained at VLX+VI2 by the second capacitor C2.

When the first control signal is again at a high level, the first diode D1 is turned off, the second diode D2 is turned on, and the voltage of the first end of the second capacitor C2 is charged again to be at VLX+VI2.

The circulation is performed as above so that the voltage at the first end of the second capacitor C2 is always VLX+VI2. This achieves the effect of stable voltage dividing. At this time, the output voltage of the first triode Q1 is controlled by the second control signal output by the power chip 105. When the power chip 105 acquires that the output first triode Q1 is too high, that is, the power circuit voltage is too high, a new control signal is output to the base of the first triode Q1 to form a feedback. Thereby the base current of the first triode Q1 is adjusted, thereby adjusting the cross-voltage between the emitter and the collector of the first triode Q1, so that the power circuit is always stable at the configured value, then the power circuit may achieve a stable output and achieve a good cooling effect.

The above describes the operating process of the voltage dividing effect achieved by different voltage dividing branches, wherein the cooling of the power circuit is realized from the circuit, and may be used in a power circuit including a switch module. The structure is simple, the effect is good, and the economic value is extremely high.

To solve the above problems, the present application further provides a driving circuit for display panel comprising the power circuit as described above.

It should be noted that since the driving circuit of display panel of the present application includes all the embodiments of the above power circuit, the driving circuit of display panel of the present application has all the technical effects of the above power circuit, and details are not described herein again.

To solve the purpose problems, the present application further provides a display device comprising the driving circuit for display panel as described above.

It should be noted that since the display device of the present application includes all the embodiments of the above driving circuit for display panel, the display device of the present application has all the technical effects of the above driving circuit for display panel, and details are not described herein again.

The above mentioned is only the optional embodiment of the present application, which does not limit the patent scope of the present application, and any equivalent structure transformation made by using the specification and the drawings of the present application or direct/indirect applications in other related technical fields should be contained in the scope of patent protection in a similar way.

What is claimed is:

1. A power circuit, wherein the power circuit comprises:
a power input end;
a power chip having a first control end and a second control end; the power chip outputs a first control signal through a first control end, and outputs a second control signal through a second control end;
a voltage dividing module, an input end of which is connected to the power input end; the voltage dividing module outputs after dividing a voltage of the power input from the power input end;
a power converter, an input end of which is connected to an output end of the voltage dividing module, and a controlled end of which is connected to the first control end of the power chip; the power converter outputs after converting a power voltage output by the voltage dividing module according to the first control signal;
a first switch module and a power output end, an input end of the first switch module being connected to an output end of the power converter, and an output end of the first switch module being connected to the power output end, and a controlled end of the first switch module being connected to the second control end of the power chip; the first switch module adjusts a size of a power voltage output by the power converter according to the second control signal.

2. The power circuit according to claim 1, wherein the voltage dividing module includes a common output end and a plurality of voltage dividing resistors; the plurality of voltage dividing resistors are sequentially connected in series between the power input end and the ground, a connection node between the two voltage dividing resistors connected to each other constitutes a voltage dividing output end, and the common output end is separately connected to any one of the voltage dividing output ends through a conductive member.

3. The power circuit according to claim 2, wherein the conductive member is a resistor or a metal wire.

4. The power circuit according to claim 2, wherein the number of the common output ends is configured corresponding to the number of the connection ends, and on a circuit substrate carried by the voltage dividing module, each of the common output ends is configured adjacent to and corresponding to a position of one of the connection ends.

5. The power circuit according to claim 1, wherein the power converter includes a second switch module and an energy storage module; an input end of the second switch module is connected to an output end of the voltage dividing module, an output end of the second switch module is an output end of the power converter, and a common connection end of the second switch module is connected to an output end of the energy storage module; an input end of the energy storage module is a controlled end of the power converter.

6. The power circuit according to claim 5, wherein the second switch module includes a first diode and a second diode; an anode of the first diode is an input end of the second switch module, and a cathode of the first diode is connected to the anode of the second diode; a connection node of the first diode and the second diode is a common connection end of the second switch module, and the cathode of the second diode is an output end of the second switch module.

7. The power circuit according to claim 5, wherein the energy storage module is a first capacitor, a first end of the first capacitor is an input end of the energy storage module, and a second end of the first capacitor is an output end of the energy storage module.

8. The power circuit for a memory according to claim 1, wherein the first switch module is encapsulated in the power chip.

9. The power circuit according to claim 1, wherein the first switch module includes a first triode and a tenth resistor; a base of the first triode is connected to a first end of the tenth resistor, and a connection node of the base of the first triode and the first end of the tenth resistor is a controlled end of the first switch module; a collector of the first triode is an output end of the first switch module, and an emitter of the first triode is connected to a second end of the tenth resistor; a connection node of the emitter of the first triode and the second end of the tenth resistor is an input end of the first switch module.

10. The power circuit according to claim 1, wherein the power circuit further includes a first voltage stabilizing module; an input/output end of the first voltage stabilizing module is respectively connected to an input end of the first switch module, and the input/output end of the first voltage stabilizing module is respectively connected to the output end of the second switch module.

11. The power circuit according to claim 10, wherein the first voltage stabilizing module includes a second capacitor, a first end of the second capacitor is an input/output end of the first voltage stabilizing module, and a second end of the second capacitor is grounded.

12. The power circuit according to claim 1, wherein the power circuit further includes a second voltage stabilizing module and a third voltage stabilizing module; a first end of the second voltage stabilizing module is respectively connected to an input end of the first switch module, and a second end of the second voltage stabilizing module is grounded; a first end of the third voltage stabilizing module is connected to an output end of the voltage dividing module, and a second end of the third voltage stabilizing module is grounded.

13. The power circuit according to claim 12, wherein the second voltage stabilizing module is a third capacitor, and the third voltage stabilizing module is a fourth capacitor.

14. A driving circuit for display panel, wherein the driving circuit for display panel comprises a power circuit including:
a power input end;
a power chip having a first control end and a second control end; the power chip outputs a first control signal through a first control end, and outputs a second control signal through a second control end;
a voltage dividing module, an input end of which is connected to the power input end; the voltage dividing module outputs after dividing a voltage of the power input from the power input end;
a power converter, an input end of which is connected to an output end of the voltage dividing module, and a controlled end of which is connected to the first control end of the power chip; the power converter outputs after converting a power voltage output by the voltage dividing module according to the first control signal;
a first switch module and a power output end, an input end of the first switch module being connected to an output end of the power converter, and an output end of the first switch module being connected to the power output end, and a controlled end of the first switch module being connected to the second control end of the power chip; the first switch module adjusts a size of a power voltage output by the power converter according to the second control signal.

15. The driving circuit for display panel according to claim 14, wherein the voltage dividing module includes a common output end and a plurality of voltage dividing resistors; the plurality of voltage dividing resistors are sequentially connected in series between the power input end and the ground, a connection node between the two voltage dividing resistors connected to each other constitutes a voltage dividing output end, and the common output end is separately connected to any one of the voltage dividing output ends through a conductive member.

16. The driving circuit for display panel according to claim 15, wherein the conductive member is a resistor or a metal wire.

17. The driving circuit for display panel according to claim 15, wherein the number of the common output ends is configured corresponding to the number of the connection ends, and on a circuit substrate carried by the voltage dividing module, each of the common output ends is configured adjacent to and corresponding to a position of one of the connection ends.

18. The driving circuit for display panel according to claim 14, wherein the power converter includes a second switch module and an energy storage module; an input end of the second switch module is connected to an output end of the voltage dividing module, an output end of the second switch module is an output end of the power converter, and a common connection end of the second switch module is connected to an output end of the energy storage module; an input end of the energy storage module is a controlled end of the power converter.

19. The driving circuit for display panel according to claim 18, wherein the second switch module includes a first diode and a second diode; an anode of the first diode is an input end of the second switch module, and a cathode of the first diode is connected to the anode of the second diode; a connection node of the first diode and the second diode is a common connection end of the second switch module, and the cathode of the second diode is an output end of the second switch module.

20. A display device, wherein the display device comprises a driving circuit for display panel, the driving circuit for display panel including a power circuit, the power circuit including:
- a power input end;
- a power chip having a first control end and a second control end; the power chip outputs a first control signal through a first control end, and outputs a second control signal through a second control end;
- a voltage dividing module, an input end of which is connected to the power input end; the voltage dividing module outputs after dividing a voltage of the power input from the power input end;
- a power converter, an input end of which is connected to an output end of the voltage dividing module, and a controlled end of which is connected to the first control end of the power chip; the power converter outputs after converting a power voltage output by the voltage dividing module according to the first control signal;
- a first switch module and a power output end, an input end of the first switch module being connected to an output end of the power converter, and an output end of the first switch module being connected to the power output end, and a controlled end of the first switch module being connected to the second control end of the power chip; the first switch module adjusts a size of a power voltage output by the power converter according to the second control signal.

\* \* \* \* \*